Nov. 4, 1930. L. R. HUFF 1,780,524
PLATE VALVE
Filed Nov. 22, 1928
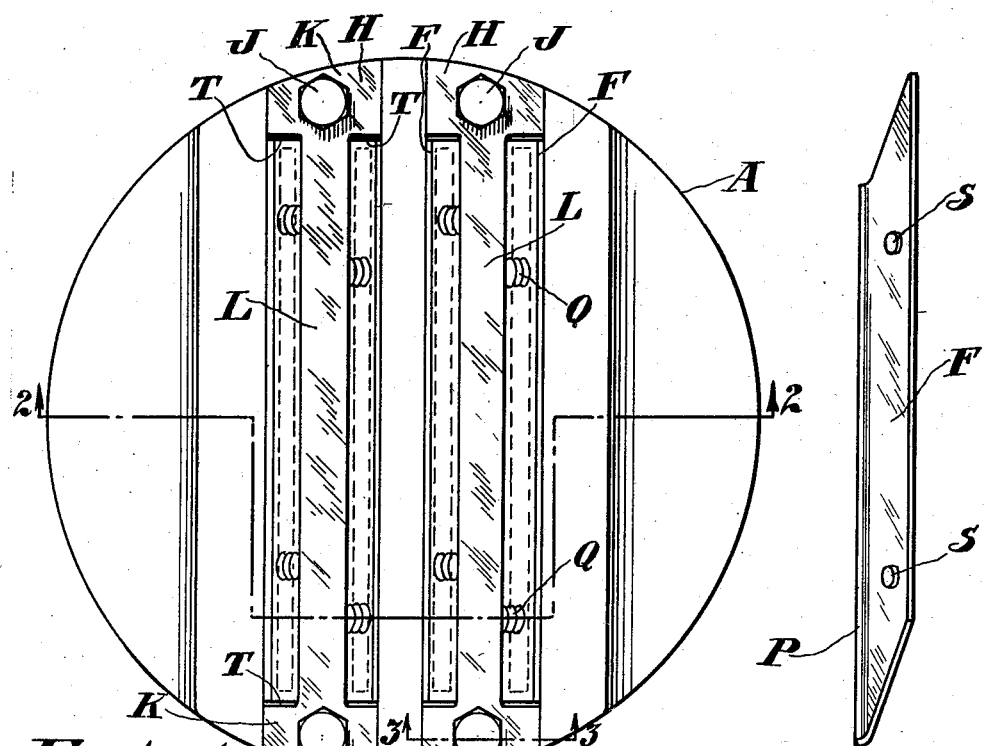
FIG.-1.
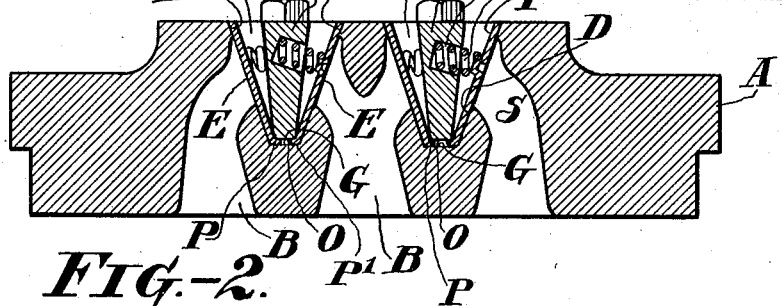
FIG.-2.
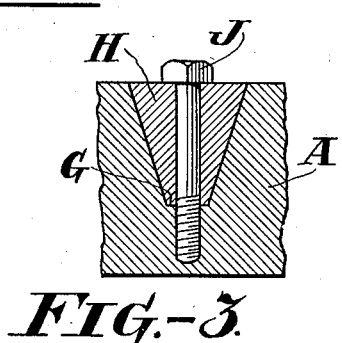
FIG.-3.
FIG.-4.
INVENTOR.
Leslie R. Huff
BY
HIS ATTORNEY.

Patented Nov. 4, 1930

1,780,524

UNITED STATES PATENT OFFICE

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY

PLATE VALVE

Application filed November 22, 1928. Serial No. 321,103.

This invention relates to plate valves, but more particularly to improvements in plate valves of the type in which the valve plates are pivoted or oscillated on one end for controlling communication between a pumping apparatus, such as a compressor and the element into which the pressure fluid is discharged.

One object of the invention is to insure the positive retention of the valve plates in the valve seat.

Another object is to reduce the costs of construction and maintenance and to reduce the number of parts required in a valve of this type to a minimum.

Other objects will be in part obvious and in part pointed out hereinafter.

In the drawings illustrating the invention and in which similar reference characters refer to similar parts, Figure 1 is a top plan view of a plate valve constructed in accordance with the practice of the invention, Figure 2 is a sectional view taken on the line 2—2 in Figure 1 looking in the direction indicated by the arrows, Figure 3 is a similar view taken on the line 3—3 in Figure 1 looking in the direction indicated by the arrows, and Figure 4 is a perspective view of a valve plate.

Referring more particularly to the drawings, A designates a valve seat in this instance of cylindrical form having a passageway or passageways B through which fluid may pass from a compressor, pump, or similar machine to which the plate valve may be applied.

The valve seat A is provided with a series of grooves C in one end thereof which may extend entirely across the face of the valve seat. The grooves C are preferably formed parallel with respect to each other and may, as illustrated, have diverging sides D which surround the outlet openings E of the passages B to form seating surfaces for flat rigid valve plates F disposed in the grooves C. The grooves C are in this instance provided with flat end surfaces G to form supports for the valve plates F and also for stop plates H disposed in the grooves C and secured at their ends to the valve seat A by means of bolts or screws J.

The stop plates H are in the form of strips of substantially the same length as the grooves C wherein they are disposed. At the ends of the stop plates H are formed heads K which are of substantially the same conformation as the grooves C.

The portions L of the stop plates H intermediate the heads K are suitably recessed on opposite sides to permit of limited oscillatory movement of the valve plates F between the seating surfaces D and the stop plates. At the sides of the stop plates H adjacent the flat surfaces G are recesses O which extend across the intermediate portion L of the stop plates H and from one head K to the other to form surfaces or shoulders P on the stop plates H which, in the assembled position of the plate valve, overlie the surfaces G and are spaced at a suitable distance therefrom.

Means are provided for assuring the retention of the valve plates F in the grooves C. These means are in the form of hook portions or shoulders P' on the side of the valve plates and the hook portions preferably form an integral portion of the said valve plates. The hook portions P' extend loosely into the space between the surfaces G and P to engage the surfaces G of the valve stops and thus act as pivots for the valve plates and whereon the said valve plates F are adapted to rock.

In order that the valve plates may be promptly closed after the discharge of fluid from the passageways B, coil springs Q are interposed between the valve plates F and the stop plates H. Preferably the stop plates H are provided with sockets R into which the springs Q may be compressed between the valve plates F when the valve plates are in the open position. The sockets R thus serve as spring seats for the springs and the springs Q are held against relative movement with respect to the valve plates F by means of buttons or knobs S on the valve plates which may be an integral portion of the valve plates or may be separate pieces and secured to the valve plates in any suitable and convenient manner.

At the juncture of the intermediate portion L of the stop plate H and the heads K are lateral shoulders T which cooperate with the ends of the valve plates F for preventing excessive longitudinal movement of the valve plates F with respect to the seating surface D.

From the foregoing description, it will be observed that the valve plates will at all times be adequately held against any form of movement relatively to the valve seats A other than the opening movement which will be imparted thereto by the pressure of the fluid flowing through the passageways B and the reverse movement resulting from the pressure of the springs Q for closing the valve plates. This is accomplished without resorting to the use of cumbersome and costly retaining means but by an integral portion of the valve plate. Due to this form of construction the valve plates may be readily held in the desired assembled positions, and fluid tight seating surfaces between the valve plates and their seats will therefore be assured.

I claim:

1. In a plate valve assembly, the combination of a valve seat having grooves therein and passageways in the valve seat opening into the grooves, stop plates in the grooves, diverging sides in the grooves to form seating surfaces around the outlet openings of the passageways, rigid valve plates in the grooves cooperating with the seating surfaces for controlling the passageways, means integral with the valve plates and engaging the stop plates for retaining the valve plates in the grooves, and springs interposed between the valve plates and the stop plates for closing the valve plates.

2. In a plate valve assembly, the combination of a valve seat having grooves therein and passageways in the valve seat opening into the grooves, stop plates in the grooves, diverging sides in the grooves to form seating surfaces around the outlet openings of the passageways, rigid valve plates in the grooves cooperating with the seating surfaces for controlling the passageways, shoulders near the ends of the stop plates forming abutments for the ends of the valve plates to limit longitudinal movement of said valve plates in the grooves, hook portions on the valve plates extending loosely between the stop plates and the bottoms of the grooves and engaging the stop plates for retaining the valve plates in the grooves and to form pivots for the valve plates, and springs seated on the stop plates and the valve plates for closing said valve plates.

3. In a plate valve assembly, the combination of a valve seat having grooves therein, and passageways in the valve seat opening into the grooves, said grooves having inclined surfaces to form valve seats, stop plates in the grooves having shoulders near their ends and having recesses to form spaces between the said stop plates and the bottoms of the grooves, rigid valve plates in the grooves adapted to seat on the seating surfaces for controlling the passageways, hooks integral with the valve plates and extending loosely into the spaces to form pivots for the valve plates, said hooks being adapted to engage said stop plates for retaining the valve plates in the grooves, and coil springs interposed between the stop plates and the valve plates for closing said valve plates.

4. In a plate valve assembly, the combination of a valve seat having grooves therein and passageways in the valve seat opening into the grooves, said grooves having diverging sides to form inclined seating surfaces, stop plates in the grooves having recesses in opposite sides thereof, shoulders at the ends of the recesses, a rigid valve plate in each recess adapted to seat on the seating surfaces for controlling the passageways, integral hook portions on the valve extending loosely between the stop plates and the bottoms of the grooves to retain the valve plates in the grooves and to form pivots for the said valve plates, said valve plates being adapted to abut with their ends the shoulders on the stop plates to prevent endwise movement of the valve plates, and coil springs interposed between the stop plates and the valve plates for closing said valve plates.

In testimony whereof I have signed this specification.

LESLIE R. HUFF.